United States Patent
Oomi

(10) Patent No.: US 9,956,833 B2
(45) Date of Patent: May 1, 2018

(54) IN-VEHICLE REPORTING APPARATUS AND REPORTING SYSTEM

(71) Applicants: AutoNetworks Technologies, Ltd., Yokkaichi, Mie (JP); Sumitomo Wiring Systems, Ltd., Yokkaichi-shi, Mie (JP); Sumitomo Electric Industries, Ltd., Osaka-shi, Osaka (JP)

(72) Inventor: Norichika Oomi, Mie (JP)

(73) Assignees: AutoNetworks Technologies, Ltd., Yokkaichi, Mie (JP); Sumitomo Wiring Systems, Ltd., Yokkaichi-shi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days. days.

(21) Appl. No.: 15/532,933

(22) PCT Filed: Dec. 4, 2015

(86) PCT No.: PCT/JP2015/084102
§ 371 (c)(1),
(2) Date: Jun. 2, 2017

(87) PCT Pub. No.: WO2016/088865
PCT Pub. Date: Jun. 9, 2016

(65) Prior Publication Data
US 2017/0326928 A1 Nov. 16, 2017

(30) Foreign Application Priority Data
Dec. 5, 2014 (JP) .................................. 2014-247117

(51) Int. Cl.
*B60C 23/00* (2006.01)
*B60C 23/06* (2006.01)
(Continued)

(52) U.S. Cl.
CPC .............. *B60C 23/06* (2013.01); *B60C 23/02* (2013.01); *B60C 23/04* (2013.01); *G01L 17/00* (2013.01)

(58) Field of Classification Search
CPC ..... B60C 23/06; B60C 23/04; B60C 23/0408; B60C 23/0415; B60C 23/0416; B60C 23/0433; B60C 23/02; G01L 17/00
(Continued)

(56) References Cited

U.S. PATENT DOCUMENTS

2004/0134270 A1   7/2004  Hirohama
2007/0229240 A1* 10/2007 Yasuda ................... B60C 23/04
                                                              340/442

FOREIGN PATENT DOCUMENTS

JP      2004-210244 A    7/2004
JP      2004-359122 A   12/2004
(Continued)

OTHER PUBLICATIONS

Search Report for International Application No. PCT/JP2015/084102, dated Jan. 16, 2016, 6 pp.

*Primary Examiner* — Thomas Mullen
(74) *Attorney, Agent, or Firm* — Dinsmore & Shohl LLP

(57) ABSTRACT

Provided are an in-vehicle reporting apparatus and a reporting system configured to prevent errors in reporting. The in-vehicle reporting apparatus stores a mounting position of each tire in association with identification information identifying the tire, a vehicle height acquisition unit acquires a vehicle height of the vehicle, a vehicle height determination unit determines whether the vehicle height is greater than or equal to a predetermined height, and a reporting unit reports information that depends on the mounting position of a tire stored in the storage unit in association with acquired identification information and on acquired air pressure information of the tire when the acquired vehicle height is not (Continued)

greater than or equal to the predetermined height, and does not report information that depends on the mounting position of the tire, when the acquired vehicle height is greater than or equal to the predetermined height.

4 Claims, 7 Drawing Sheets

(51) Int. Cl.
    *B60C 23/04*     (2006.01)
    *B60C 23/02*     (2006.01)
    *G01L 17/00*     (2006.01)

(58) Field of Classification Search
    USPC .................................................. 340/442–447
    See application file for complete search history.

(56) References Cited

FOREIGN PATENT DOCUMENTS

| | | |
|---|---|---|
| JP | 2006-159961 A | 6/2006 |
| JP | 2015-096339 A | 5/2015 |

\* cited by examiner

| APPARATUS ID | MOUNTING POSITION |
|---|---|
| 1 | FRONT RIGHT |
| 2 | BACK RIGHT |
| 3 | FRONT LEFT |
| 4 | BACK LEFT |

IN-VEHICLE REPORTING APPARATUS AND REPORTING SYSTEM

CROSS-REFERENCE TO RELATED APPLICATIONS

This application is the U.S. national stage of PCT/JP2015/084102 filed Dec. 4, 2015, which claims priority of Japanese Patent Application No. JP 2014-247117 filed Dec. 5, 2014.

TECHNICAL FIELD

The instant invention relates to an in-vehicle reporting apparatus for performing reporting that depends on air pressure information related to respective air pressures of a plurality of tires provided on a vehicle, and a reporting system that includes the reporting apparatus.

BACKGROUND

In recent years, TPMSs (Tire Pressure Monitoring Systems) that detect the air pressures of a plurality of tires provided on a vehicle and emit a warning or the like to a user in the case where the detected air pressure is abnormal have been available. For example, a TPMS includes a transmission apparatus that detects the air pressure of a tire and wirelessly transmits the detected air pressure, and an in-vehicle reporting apparatus that receives the air pressure wirelessly transmitted from the transmission apparatus and performs reporting that depends on the received air pressure. Generally, the transmission apparatus is disposed on a tire wheel provided on the vehicle and detects the air pressure of a tire mounted on the tire wheel. The in-vehicle reporting apparatus, for example, reports the received air pressure to the user as the air pressure of the tire from which the air pressure was detected.

A TPMS (tire pressure monitoring apparatus) described in JP 2006-159961A includes means for registering a tire identification code that identifies each of a plurality of tires that are provided on a vehicle in a memory, and means for judging that a tire has been replaced. This TPMS updates the tire identification code registered in the memory in the case where it is judged that a tire has been replaced. Accordingly, the TPMS described in JP 2006-159961A is able to prevent errors in the correspondence relationship of received air pressures and tires, even in the case where the position of a tire with respect to the vehicle changes as a result of tire rotation or the like, for example, by updating the tire identification code. Thus, the TPMS described in JP 2006-159961A is able to report the air pressure without mistaking the tire from which the air pressure was detected.

However, with the TPMS described in JP 2006-159961A, a special configuration such as a contact switch or an infrared switch provided on the axle needs to be used, in order for the means for judging that a tire has been replaced to judge whether the tire wheel is attached to the vehicle. Thus, with the TPMS of JP 2006-159961A, there is a problem in that costs concerning the configuration of the system increase, due to needing to provide the special configuration. Also, the air pressure monitoring apparatus needs to receive a signal that is transmitted depending on the operating state of a centrifugal force sensor provided in the transmission apparatus (tire pressure sensor). Thus, with the TPMS of JP 2006-159961A, in the case where the air pressure monitoring apparatus is not able to receive this signal, the judging means is not able to judge that the tire has been replaced, and there is a risk of performing erroneous reporting, due to the correspondence relationship of the received air pressure and the tire from which the air pressure was detected being in error.

An object of the instant invention is to provide an in-vehicle reporting apparatus and a reporting system that are able to prevent errors in reporting that depends on acquired air pressure information, when air pressure information related to respective air pressures of a plurality of tires provided on a vehicle is acquired, and to suppress an increase in costs concerning the configuration.

SUMMARY OF THE INVENTION

An in-vehicle reporting apparatus according to one aspect of the present invention is an in-vehicle reporting apparatus that has an air pressure information acquisition unit configured to acquire identification information identifying each of a plurality of tires provided on a vehicle and air pressure information related to an air pressure of each of the plurality of tires, and that performs reporting that depends on the identification information and the air pressure information acquired by the air pressure information acquisition unit, the apparatus including a storage unit configured to store a mounting position of each of the plurality of tires in association with the identification information identifying the tire, a vehicle height acquisition unit configured to acquire a vehicle height of the vehicle, a vehicle height determination unit configured to determine whether the vehicle height acquired by the vehicle height acquisition unit is greater than or equal to a predetermined height, and a detection unit configured to report information that depends on the mounting position of a tire stored in the storage unit in association with the identification information acquired by the air pressure information acquisition unit and on the air pressure information of the tire acquired by the air pressure information acquisition unit, in a case where the vehicle height determination unit determines that the acquired vehicle height is not greater than or equal to the predetermined height, and to not report at least information that depends on the mounting position of the tire, in a case where the vehicle height determination unit determines that the acquired vehicle height is greater than or equal to the predetermined height.

A reporting system according to one aspect of the present invention includes the above-mentioned in-vehicle reporting apparatus and a plurality of transmission apparatuses respectively disposed on a plurality of tire wheels provided on a vehicle and configured to detect an air pressure of a corresponding tire and transmit air pressure information including the detected air pressure and identification information identifying the corresponding tire, the air pressure information acquisition unit being configured to acquire the air pressure information and the identification information transmitted from each of the plurality of transmission apparatuses.

Note that the instant invention can be not only realized as an in-vehicle reporting apparatus and a reporting system that are provided with such characteristic processing units, but can also be realized as a reporting method in which the characteristic processing is configured as steps, or as a program for causing a computer to execute the steps. Also, the instant invention can be realized as a semiconductor integrated circuit that realizes part or all of the in-vehicle reporting apparatus and the reporting system, or as another system that includes the in-vehicle reporting apparatus and the reporting system.

According to the above, errors in reporting that depends on acquired air pressure information can be prevented when air pressure information related to respective air pressures of a plurality of tires provided on a vehicle is acquired, and an increase in costs concerning the configuration can be suppressed.

DETAILED DESCRIPTION OF THE PREFERRED EMBODIMENTS

Figure 1:
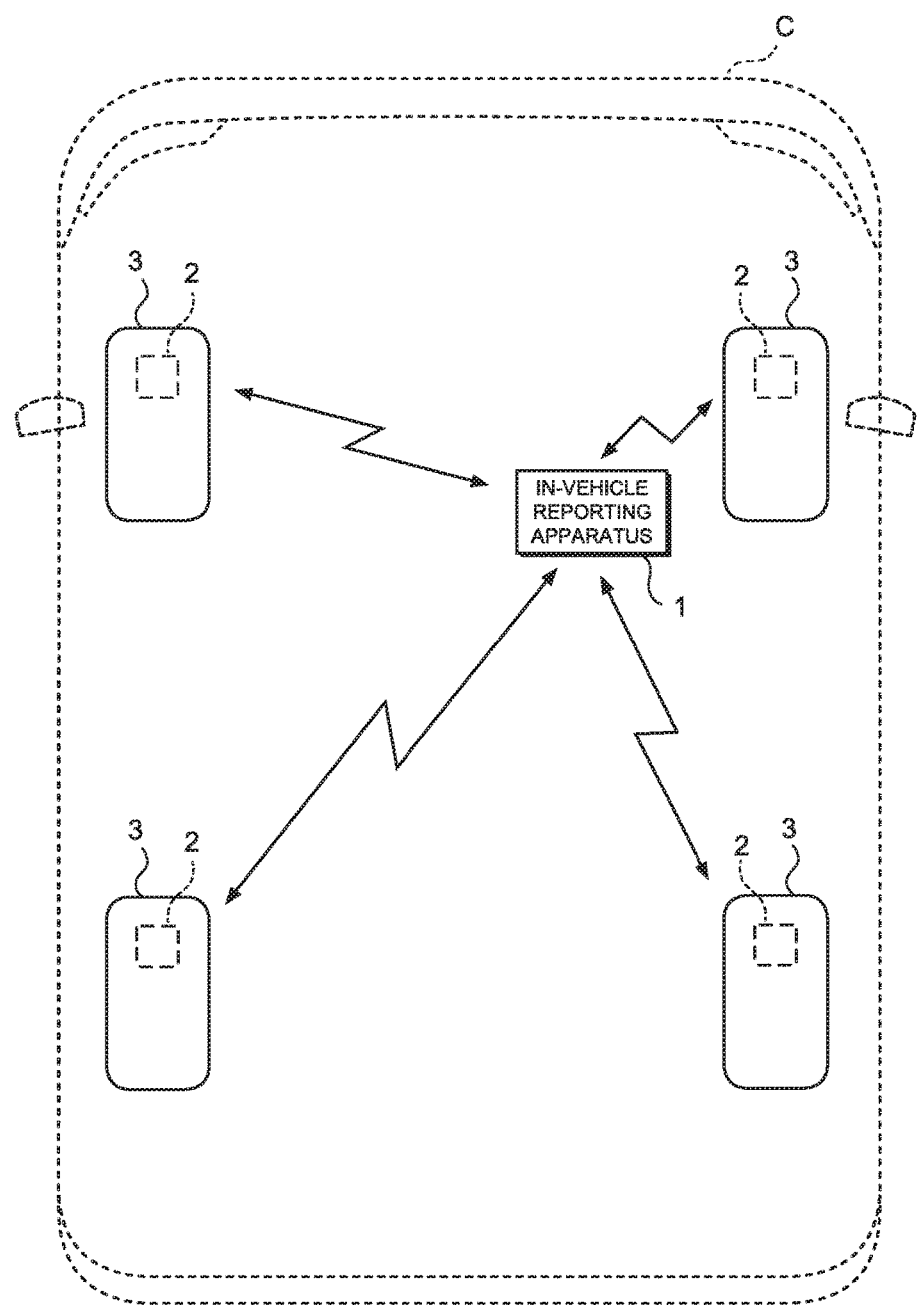
FIG. 1 is a schematic diagram showing an exemplary configuration of a reporting system in an embodiment.

Initially embodiments of the present invention will be recited. Also, the embodiments described below may be suitably combined at least in part.

(1) An in-vehicle reporting apparatus according to one aspect of the present invention is an in-vehicle reporting apparatus that has an air pressure information acquisition unit configured to acquire identification information identifying each of a plurality of tires provided on a vehicle and air pressure information related to an air pressure of each of the plurality of tires, and that performs reporting that depends on the identification information and the air pressure information acquired by the air pressure information acquisition unit, the apparatus including a storage unit configured to store a mounting position of each of the plurality of tires in association with the identification information identifying the tire, a vehicle height acquisition unit configured to acquire a vehicle height of the vehicle, a vehicle height determination unit configured to determine whether the vehicle height acquired by the vehicle height acquisition unit is greater than or equal to a predetermined height, and a detection unit configured to report information that depends on the mounting position of a tire stored in the storage unit in association with the identification information acquired by the air pressure information acquisition unit and on the air pressure information of the tire acquired by the air pressure information acquisition unit, in a case where the vehicle height determination unit determines that the acquired vehicle height is not greater than or equal to the predetermined height, and to not report at least information that depends on the mounting position of the tire, in a case where the vehicle height determination unit determines that the acquired vehicle height is greater than or equal to the predetermined height.

In the instant invention, the storage unit stores the mounting positions of a plurality of tires in association with identification information that identifies the respective tires. The vehicle height acquisition unit acquires the height of the vehicle. The vehicle height determination unit determines whether the vehicle height acquired by the vehicle height acquisition unit is greater than or equal to a predetermined height. The reporting unit reports information that depends on the mounting position of a tire stored in the storage unit in association with the acquired identification information and on the acquired air pressure information of the tire, in the case where the vehicle height determination unit determines that the acquired vehicle height is not greater than or equal to the predetermined height. Accordingly, the in-vehicle reporting apparatus is able to determine whether a tire has been replaced based on the acquired vehicle height, and to change the reporting mode depending on whether any of the plurality of tires provided on the vehicle have been replaced. The in-vehicle reporting apparatus is able to report information that depends on the mounting position of a tire and the air pressure of the tire in the case where none of the tires have been replaced, and to prevent errors in reporting by, for example, not performing reporting for every mounting position, in the case where any of the tires have been replaced. Also, the in-vehicle reporting apparatus is able to use a configuration capable of detecting vehicle height that can be installed in a typical vehicle such as a vehicle height sensor that is used in control related to optical axis adjustment of headlights, pressure control of air suspension or the like, and to suppress an increase in costs concerning the configuration.

(2) A configuration is preferably adopted in which the reporting unit is configured to report information that depends on the air pressure information of the tire acquired by the air pressure information acquisition unit, in the case where the vehicle height determination unit determines that the acquired vehicle height is greater than or equal to the predetermined height.

In the instant invention, the reporting unit reports information that depends on the air pressure information of the tire acquired by the air pressure information acquisition unit, in the case where the vehicle height determination unit determines that the acquired vehicle height is greater than or equal to the predetermined height. Accordingly, the in-vehicle reporting apparatus is able to report information that depends on the acquired air pressure without performing reporting for every mounting position, even in the case where any of the tires have been replaced, thus improving convenience.

(3) A configuration is preferably adopted in which the in-vehicle reporting apparatus further includes an air pressure threshold determination unit configured to determine whether an air pressure indicated by the acquired air pressure information is less than or equal to a predetermined threshold, and the reporting unit is configured to report a result of the determination by the air pressure threshold determination unit, in the case where the vehicle height determination unit determines that the acquired vehicle height is greater than or equal to the predetermined height.

In the instant invention, the air pressure threshold determination unit determines whether the air pressure that is indicated by the acquired air pressure information is less than or equal to a predetermined threshold. The reporting unit reports the determination result of the air pressure threshold determination unit, in the case where the vehicle height determination unit determines that the acquired vehicle height is greater than or equal to predetermined height. Accordingly, the in-vehicle reporting apparatus is able to prevent errors in reporting in the case where any of the plurality of tires have been replaced, by not reporting, for every mounting position of a tire, information that depends on the air pressure of the tire, for example. Also, the user can at least be made aware that the air pressure of one or more of the tires is low even in the case where a tire has been replaced. Thus, convenience for the user can be improved.

(4) A configuration is preferably adopted in which the vehicle height acquisition unit is configured to acquire the vehicle height of the vehicle repetitively, and the vehicle height determination unit is configured to determine whether the vehicle height repetitively acquired by the vehicle height acquisition unit is continuously greater than or equal to the predetermined height for greater than or equal to a predetermined time period or a predetermined number of times.

In the instant invention, the vehicle height acquisition unit repetitively acquires the vehicle height of the vehicle. The vehicle height determination unit determines whether the vehicle height repetitively acquired by the vehicle height acquisition unit is continuously greater than or equal to a predetermined height for greater than or equal to a predetermined time period or a predetermined number of times. Accordingly, the in-vehicle reporting apparatus is able to more accurately determine whether tire replacement has been performed, by determining that tire replacement has been performed in the case where the height of the vehicle is continuously greater than or equal to the predetermined height.

(5) A reporting system according to one aspect of the instant invention includes the above-mentioned in-vehicle reporting apparatus and a plurality of transmission apparatuses respectively disposed on a plurality of tire wheels provided on a vehicle and configured to detect an air pressure of a corresponding tire and transmit air pressure information including the detected air pressure and identification information identifying the corresponding tire, the air pressure information acquisition unit being configured to acquire the air pressure information and the identification information transmitted from each of the plurality of transmission apparatuses.

In the instant invention, a plurality of transmission apparatuses are respectively provided on a plurality of tires provided on a vehicle, and detect the air pressures of the tires on which they are provided. Also, the plurality of transmission apparatuses transmit air pressure information including the detected air pressures and identification information identifying the tires. The above-mentioned in-vehicle reporting apparatus acquires the air pressure information and the identification information respectively transmitted from the plurality of transmission apparatuses. Accordingly, the in-vehicle reporting apparatus is able to change the reporting mode depending on whether any of the plurality of tires provided on the vehicle have been replaced. The in-vehicle reporting apparatus is able to report information that depends on the mounting position of a tire and the air pressure of the tire, in the case where none of the tires have been replaced, and to prevent errors in reporting by, for example, not performing reporting for every mounting position, in the case where any of the tires have been replaced. Also, the in-vehicle reporting apparatus is able to use a configuration capable of detecting vehicle height that can be installed in a typical vehicle such as a vehicle height sensor that is used in control related to optical axis adjustment of headlights, pressure control of air suspension or the like, and to suppress an increase in costs concerning the configuration.

DETAILED DESCRIPTION OF EMBODIMENTS

Specific examples of an in-vehicle reporting apparatus and a reporting system according to the embodiments of the present invention will now be described, with reference to the drawings. Note that the present invention is not limited to these illustrative examples and is defined by the claims, and all changes which come within the meaning and range of equivalency of the claims are intended to be embraced therein.

FIG. 1 is a schematic diagram showing an exemplary configuration of a reporting system of the present embodiment. The reporting system includes an in-vehicle reporting apparatus 1 provided in a vehicle C, and a transmission apparatus 2 attached to each tire wheel on which is mounted a tire 3 provided on the vehicle C. In the reporting system of the present embodiment, the air pressure of each tire 3 is acquired, by the in-vehicle reporting apparatus 1 wirelessly communicating with each transmission apparatus 2, and reporting that depends on the acquired air pressure is performed. The in-vehicle reporting apparatus 1 is an in-vehicle apparatus such as an ECU (Electronic Control Unit) disposed underneath the driver's seat of the vehicle C, for example, and transmits a request signal requesting air pressure information using radio waves on the LF (Low Frequency) band to each transmission apparatus 2. The transmission apparatus 2 detects the air pressure of the tire 3 mounted on the tire wheel to which the transmission apparatus 2 is attached, in response to the request signal of the in-vehicle reporting apparatus 1, and transmits the detected air pressure and an apparatus ID which will be discussed later to the in-vehicle reporting apparatus 1 using radio waves on the UHF (Ultra High Frequency) band. Note that the LF band and the UHF band are examples of radio wave bands that are used when performing wireless communication, and the present invention is not necessarily limited thereto.

Figure 2:
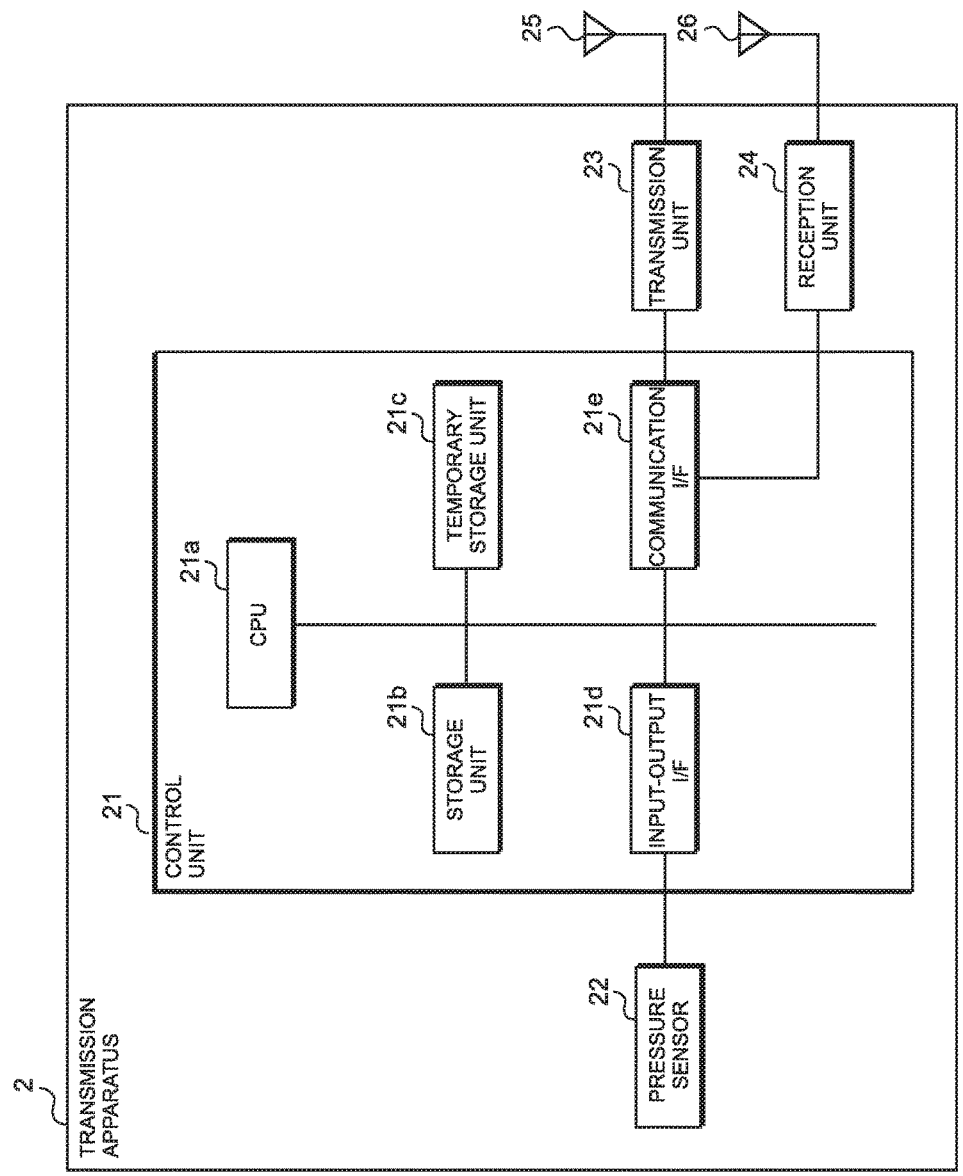
FIG. 2 is a block diagram showing the configuration of a transmission apparatus.

FIG. 2 is a block diagram showing the configuration of the transmission apparatus 2. The transmission apparatus 2 includes a control unit 21. The control unit 21 includes a CPU 21a that controls the operations of each constituent element. The CPU 21a is constituted by one or a plurality of CPUs (Central Processing Units), a multi-core CPU, or the like, for example. Also, a storage unit 21b, a temporary storage unit 21c, an input-output I/F 21d and a communication I/F 21e are connected to the CPU 21a via a bus. The CPU 21a reads out a control program, which will be discussed later, stored in the storage unit 21b, and controls each element. Here, the transmission apparatus 2 includes a battery which is not illustrated, and operates using power from the battery.

The storage unit 21b is a nonvolatile memory such as an EEPROM (Electrically Erasable Programmable ROM) or a flash memory. The control program for the CPU 21a to perform processing is stored in the storage unit 21b. The control program is a computer program in which processing contents for when the transmission apparatus 2 communicates with the in-vehicle reporting apparatus 1 and processing contents for when controlling each element are described. Also, an apparatus ID identifying the transmission apparatus 2 is stored in the storage unit 21b. Here, the transmission apparatus 2 of the present embodiment is uniquely provided on each tire 3, and the apparatus ID is information also identifying the tire 3.

The temporary storage unit 21c is a memory such as an SRAM (Static RAM) or a DRAM (Dynamic RAM). The temporary storage unit 21c temporarily stores various types of data that are produced as a result of the CPU 21a performing processing according to the control program.

A pressure sensor 22 is connected to the input-output I/F 21d. The pressure sensor 22 includes a diaphragm, for example, and detects an absolute pressure (air pressure) of the tire 3, based on the amount of deformation of the diaphragm, which changes depending on the magnitude of pressure. Absolute pressure is the magnitude of pressure that is referenced on an absolute vacuum. Note that although, in the present embodiment, air pressure that is detected by the pressure sensor 22 is described as being the absolute pressure, a configuration that detects a gauge pressure or a difference pressure indicating the magnitude of pressure relative to a predetermined reference pressure may also be adopted. The predetermined reference pressure is a median value, a lower limit or an upper limit of a range of air pressures in a state where the state of the tire 3 does not need to be inspected, for example.

The pressure sensor 22 outputs the detected air pressure of the tire 3 to the CPU 21a via the input-output I/F 21d. The CPU 21a generates a signal including the air pressure of the tire 3 and the apparatus ID that is stored in the storage unit 21b, by executing the control program.

A transmission unit 23 to which an RF transmitting antenna 25 is connected, and a reception unit 24 to which an LF receiving antenna 26 is connected are connected to the communication I/F 21e. The transmission unit 23 modulates the signal generated by the CPU 21a to a signal of a frequency band on the UHF band, and transmits the modulated signal from the RF transmitting antenna 25. The reception unit 24 receives a request signal transmitted from the in-vehicle reporting apparatus 1 using radio waves of the LF band via the LF receiving antenna 26, and outputs the received signal to the CPU 21a.

Figure 3:
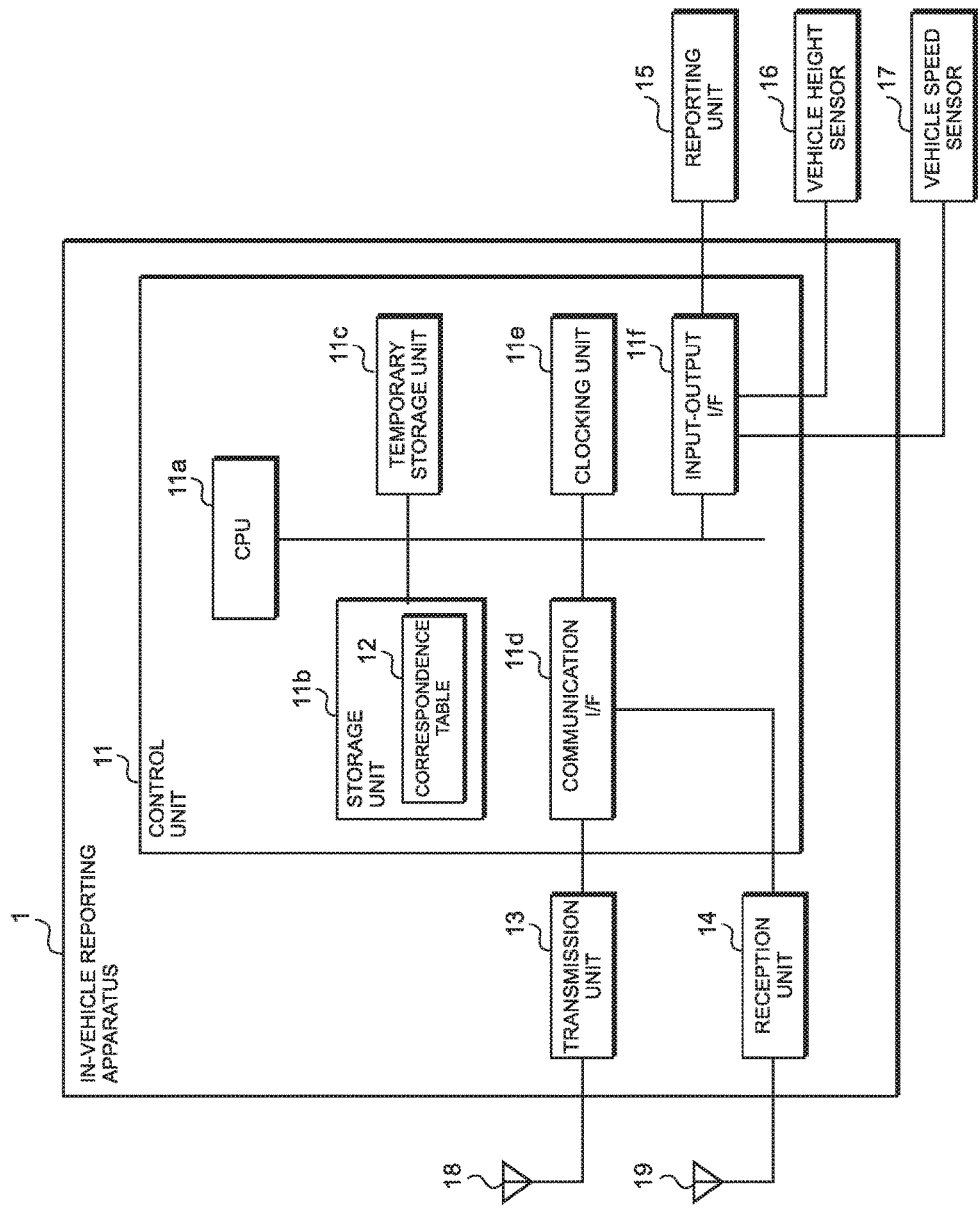
FIG. 3 is a block diagram showing the configuration of an in-vehicle reporting apparatus.

FIG. 3 is a block diagram showing the configuration of the in-vehicle reporting apparatus 1. The in-vehicle reporting apparatus 1 includes a control unit 11, and the control unit 11 includes a CPU 11a that controls the operations of each constituent element. The CPU 11a is constituted by one or a plurality of CPUs, a multi-core CPU or the like, for example. Also, a storage unit 11b, a temporary storage unit 11c, a communication I/F 11d, a clocking unit 11e and an input-output I/F 11f are connected to the CPU 11a via a bus. The CPU 11a reads out the control program, which will be discussed later, stored in the storage unit 11b, and controls each element.

The storage unit 11b is a nonvolatile memory that enables information to be rewritten, such as an EEPROM or a flash memory. The control program for the CPU 11a to perform processing is stored in the storage unit 11b. The control program is a computer program in which processing contents for generating a request signal or the like when communicating with the plurality of transmission apparatuses 2 and processing contents for when controlling each element is stored. Also, a correspondence table 12 is stored in the storage unit 11b. The correspondence table 12 is a table in which the correspondence relationship between the mounting position of each of the plurality of tires 3 and the apparatus ID of the transmission apparatus 2 disposed on each tire 3 is stored, and will be discussed later.

The temporary storage unit 11c is a memory such as an SRAM or a DRAM. The storage unit 11c temporarily stores various types of data that are produced as a result of the CPU 11a performs processing according to the control program.

A transmission unit 13 to which an LF transmitting antenna 18 is connected and a reception unit 14 to which an RF receiving antenna 19 is connected are connected to the communication I/F 11d. The transmission unit 13 modulates a request signal generated by the CPU 11a to a signal of a frequency band on the LF band or the like, and transmits the modulated signal from the LF transmitting antenna 18. The reception unit 14 receives a signal transmitted using radio waves of the UHF band from each of the plurality of transmission apparatuses 2 via the RF receiving antenna 19, and outputs the received signals to the CPU 11a. Note that one LF transmitting antenna 18 may be provided in the in-vehicle reporting apparatus 1, or a plurality of LF transmitting antennas 18 may be provided in positions approximating the tires 3.

The clocking unit 11e is constituted by a timer, a real-time clock or the like, for example, and starts clocking in accordance with the control of the CPU 11a and provides a clocking result to the CPU 11a.

A reporting unit 15, a vehicle height sensor 16 and a vehicle speed sensor 17 are connected to the input-output I/F 11f. The reporting unit 15 is, for example, a warning light provided on an instrument panel in front of the driver's seat, a display screen of car navigation, an in-vehicle speaker or the like, and reports information related to the air pressure of the plurality of tires 3. The CPU 11a switches the reporting mode of the reporting unit 15, based on information, which will be discussed later, acquired from the vehicle height sensor 16. The reporting mode of the reporting unit 15 will be discussed in detail later.

The vehicle height sensor 16 is, for example, provided in the suspension of each tire wheel of the vehicle C, and outputs a voltage that depends on the amount of elasticity of the suspension to the CPU 11a. The vehicle height sensor 16 is used in control related to optical axis adjustment of headlights provided in the vehicle C, and is used in pressure control in the case where the suspension is air suspension. The CPU 11a detects the vehicle height of the vehicle C, based on the voltage. At this time, the CPU 11a functions as a vehicle height acquisition unit, by executing the control program. Note that the vehicle height sensor 16 need only be configured to output information related to the vehicle height of the vehicle C to the CPU 11a, and may be configured to directly detect the vehicle height of the vehicle C and output information on the detected vehicle height to the CPU 11a, or to output information related to vehicle height other than the amount of elasticity of the suspension to the CPU 11a.

The speed sensor 17 is, for example, provided on the axle of the vehicle C, and outputs a pulse signal that depends on the rotation of the axle to the CPU 11a. The CPU 11a detects the vehicle speed of the vehicle C based on the pulse signal. Note that any configuration that enables the speed sensor 17 to output information related to vehicle speed such as the speed of the vehicle C or the speed of the wheels to the CPU 11a may be used.

Figures 4, 5A:
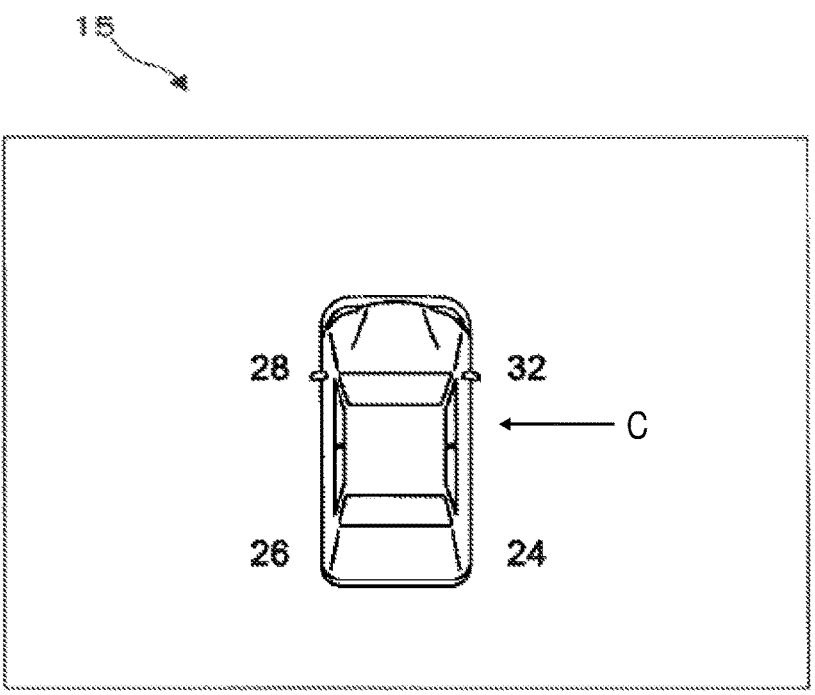
FIG. 4 is an illustrative diagram showing a specific example of a correspondence table.
FIG. 5A is a diagram showing a specific example of a reporting mode of a reporting unit.

FIG. 4 is an explanatory diagram showing a specific example of the correspondence table 12. The correspondence table 12 stores, for every apparatus ID, the mounting position of the tire 3 that is identified by the apparatus ID. For example, in the correspondence table 12 in FIG. 4, the tire 3 that is identified by the apparatus ID 1 is provided on the front right of the vehicle C. Similarly, the tire 3 that is identified by the apparatus ID 2 is provided on the back right of the vehicle C, the tire 3 that is identified by the apparatus ID 3 is provided on the front left of the vehicle C, and the tire 3 that is identified by the apparatus ID 4 is provided on the back left of the vehicle C. Note that, with the correspondence table 12, as long as the apparatus IDs and the mounting positions of the tires 3 identified by the apparatus IDs can be stored in the storage unit 11b in association with each other, the data structure at the time of storage is not limited.

The in-vehicle reporting apparatus 1, for example, updates the correspondence table 12 in the case where the vehicle C has started running, after determining that one or more of the tires 3 has been replaced. The in-vehicle reporting apparatus 1, for example, updates the correspondence table 12 based on the phase difference of the tire wheels of the vehicle C at a predetermined time interval, the reception signal strength of radio waves on the UHF band transmitted from the transmission apparatuses 2, or the like. Here, an example in which the correspondence table 12 is updated based on the phase difference of the tire wheels will now be shown. Note that updating of the correspondence table 12 may be performed other than as shown in the example below.

The in-vehicle reporting apparatus 1 detects information related to the rotation angle of each tire wheel of the vehicle C with a sensor or the like that is used in an ABS (Antilock Brake System), and calculates the phase difference of each tire wheel in a predetermined time interval, based on the detected information. Also, each transmission apparatus 2 detects information related to the rotation angle of the tire wheel on which the transmission apparatus 2 is disposed with a rotation sensor, an acceleration sensor or the like, calculates the phase difference of the tire wheel in a predetermined time interval, based on the detected information, and transmits the phase difference to the in-vehicle reporting apparatus 1. The in-vehicle reporting apparatus 1 compares the phase differences transmitted from the transmission apparatuses 2 with the phase difference calculated by the in-vehicle reporting apparatus 1, and stores the tire wheel mounting position corresponding to the phase difference having the highest correlation and the apparatus ID of that transmission apparatus 2 in the correspondence table 12 in association with each other. The in-vehicle reporting apparatus 1 updates the correspondence table 12 by comparing the phase differences for the respective transmission apparatuses 2, and storing the corresponding mounting positions and the apparatus IDs in the correspondence table 12.

Here, in the case where the mounting positions of two tires 3 are interchanged, the correspondence relationship between the mounting positions of the tires 3 and the transmission apparatuses 2 stored in the correspondence table 12 differs from the actual correspondence relationship, until the correspondence table 12 is updated.

In the reporting system constituted as described above, the in-vehicle reporting apparatus 1 determines whether any of the tires 3 have been replaced, based on the vehicle height acquired using the vehicle height sensor 16, and switches the reporting mode of information related to the air pressure of the tires 3 by the reporting unit 15 according to the determination result. A specific example of the reporting mode by the reporting unit 15 when the in-vehicle reporting apparatus 1 determines that none of the tires 3 have been replaced, and a specific example of the reporting mode by the reporting unit 15 when the in-vehicle reporting apparatus 1 determines that one or more of the tires 3 have been replaced will now be shown.

Figure 5B:
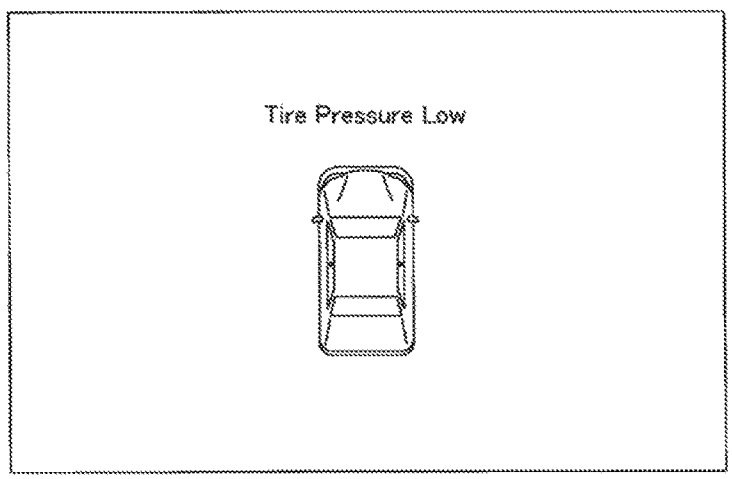
FIG. 5B is a diagram showing a specific example of the reporting mode of the reporting unit.

FIGS. 5A and 5B are diagrams showing specific examples of the reporting mode by the reporting unit 15. FIGS. 5A and 5B are enlarged views of the reporting unit 15 provided on the instrument panel, and the reporting unit 15 is provided with a display unit shaped like the vehicle C and visually displays information related to air pressure around the display unit. FIG. 5A shows an example of the reporting mode of the reporting unit 15 when the in-vehicle reporting apparatus 1 determines that none of the tires 3 have been replaced. In the reporting mode, the value of the air pressure of each tire 3 is displayed around the display unit, and the display position of each value corresponds to the mounting position of each tire 3. Specifically, the display "32" in FIG. 5A indicates the value of the air pressure of the tire 3 provided on the front right of the vehicle C, and, the display "28" indicates the value of the air pressure of the tire 3 provided on the front left of the vehicle C. Similarly, the display "24" in FIG. 5A indicates the value of the air pressure of the tire 3 provided on the back right of the vehicle C, and the display "26" indicates the air pressure of the tire 3 provided on the back left of the vehicle C.

FIG. 5B shows an example of the reporting mode of the reporting unit 15 in the case where the in-vehicle reporting apparatus 1 determines that one or more of the tires 3 have been replaced. In the case where even one of the air pressures respectively transmitted from the transmission apparatuses 2 is low, necessitating inspection, replacement or the like of the tire 3, the in-vehicle reporting apparatus 1 displays a warning message such as "Tire Pressure Low" and reports that that the air pressure of one of the tires 3 is low. At this time, the in-vehicle reporting apparatus 1 performs reporting with the reporting unit 15 without identifying the tire 3 whose air pressure is low.

Note that a configuration may be adopted in which, in FIG. 5A, in the case where the air pressure of one or a plurality of tires 3 is low, the tire 3 whose air pressure is low is identifiably reported, by displaying the value of the air pressure of the target tire 3 in a highlighted manner and displaying a warning message such as shown in FIG. 5B.

Errors in reporting can be prevented even in a period during which the correspondence table 12 has not been updated after any of the tires 3 have been replaced, by the in-vehicle reporting apparatus 1 switching the reporting mode of information related to air pressure as described above.

Next, processing performed by the in-vehicle reporting apparatus 1 for determining whether any of the tires 3 have been replaced and for switching the reporting mode of information related to air pressure will be described.

Figure 6:
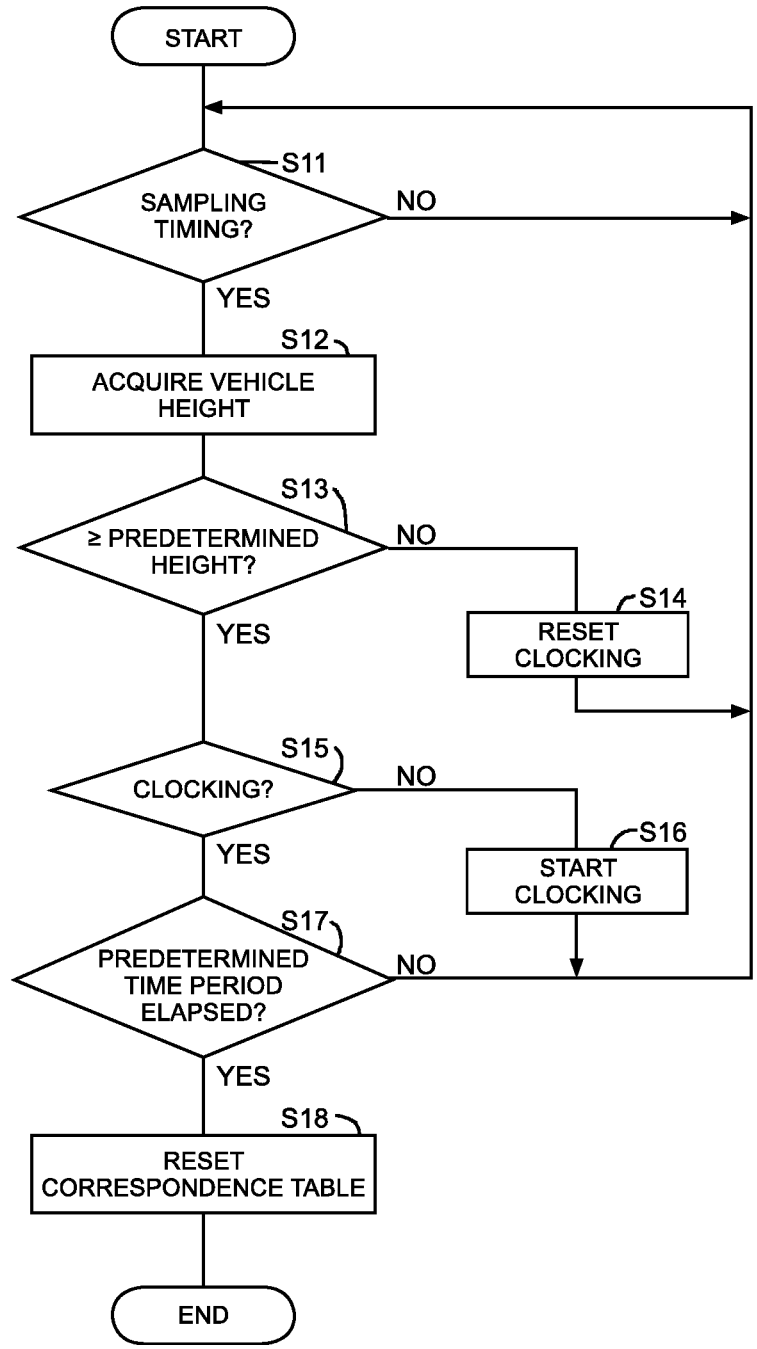
FIG. 6 is a flowchart showing a processing procedure performed by the in-vehicle reporting apparatus when determining whether a tire has been replaced based on the vehicle height of a vehicle.

FIG. 6 is a flowchart showing a processing procedure performed by the in-vehicle reporting apparatus 1 when determining whether a tire 3 has been replaced based on the vehicle height of the vehicle C. The CPU 11a of the control unit 11 in the in-vehicle reporting apparatus 1 determines whether a sampling timing at which to acquire the vehicle height of the vehicle C has been reached (step S11). The CPU 11a, for example, determines that the sampling timing at which to acquire the vehicle height has been reached, whenever a predetermined time period elapses in a state where the vehicle C has stopped. The CPU 11a determines whether the vehicle C has stopped using the vehicle speed sensor 17, for example. Also, the predetermined time period is 5 seconds, for example.

If it is determined that the sampling timing at which to acquire the vehicle height of the vehicle C has not been reached (S11: NO), the CPU 11a holds processing until the sampling timing is reached. On the other hand, in the case where it is determined that the sampling timing at which to acquire the vehicle height of the vehicle C has been reached (S11: YES), the CPU 11a acquires the vehicle height of the vehicle C from a voltage input from the vehicle height sensor 16 or the like (step S12).

The CPU 11a, having acquired the vehicle height, determines whether the acquired vehicle height is greater than or equal to a predetermined height (step S13). The predetermined height is set lower than the vehicle height when the vehicle C has been lifted up when replacing any of the tires 3, and higher than the vehicle height when the vehicle C bounces up while traveling or the like. If the acquired vehicle height is not greater than or equal to the predetermined height, that is, is lower than the predetermined height (S13: NO), the CPU 11a resets the clocking of the clocking unit 11e (step S14). The CPU 11a outputs a reset signal related to resetting of the clocking to the clocking unit 11e. Thereafter, the CPU 11a returns the processing to step S11.

If it is determined that the acquired vehicle height is greater than or equal to the predetermined height (S13: YES), the CPU 11a determines whether the clocking unit 11e is currently clocking (step S15). If it is determined that the clocking unit 11e is not currently clocking (S15: NO), the CPU 11a causes the clocking unit 11e to start clocking (step S16), and thereafter returns the processing to step S11.

If it is determined that the clocking unit 11e is currently clocking (S15: YES), the CPU 11a determines whether a predetermined time period has elapsed from when the clocking unit 11e started clocking (step S17). The predetermined time period is the time period required to replace at least one tire 3, and, as one example, is 5 minutes. The CPU 11a functions as a vehicle height determination unit, by executing the control program in steps S13 to S17.

If it is determined that the predetermined time period has not elapsed (S17: NO), the CPU 11a returns the processing to step S11. On the other hand, if it is determined that the predetermined time period has elapsed (S17: YES), the CPU 11a resets the correspondence table 12 (step S18). Specifically, the CPU 11a erases the contents of the correspondence table 12. The processing of step S18 indicates that the CPU 11a has determined that one or more of the tires 3 have been replaced. Thereafter, the CPU 11a ends the processing.

Figure 7:
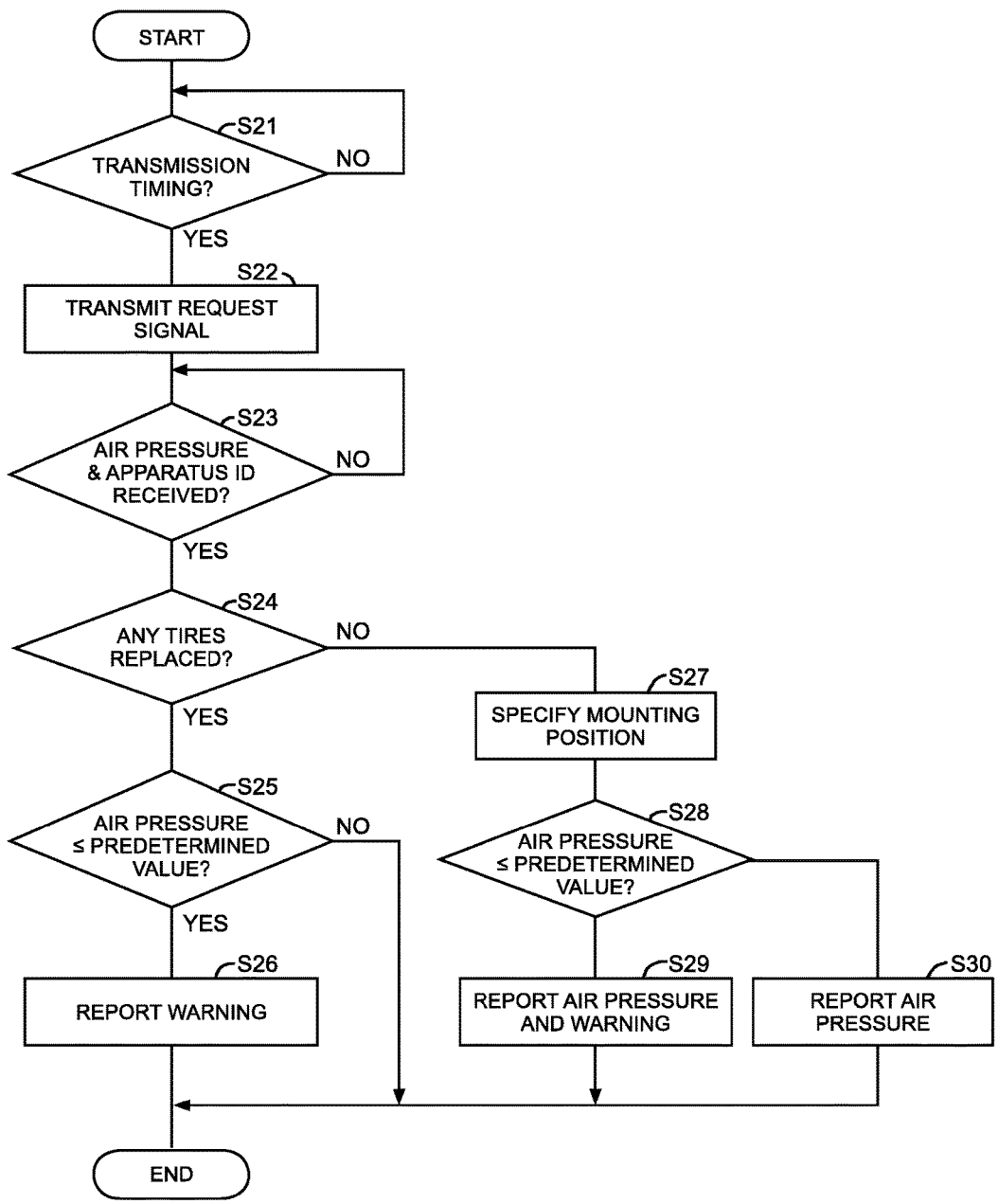
FIG. 7 is a flowchart showing a processing procedure performed by the in-vehicle reporting apparatus when reporting information related to the air pressure of a tire.

FIG. 7 is a flowchart showing a processing procedure performed by the in-vehicle reporting apparatus 1 when reporting information related to the air pressure of a tire 3. The CPU 11a of the control unit 11 in the in-vehicle reporting apparatus 1 determines whether the transmission timing of the request signal has arrived (step S21). The CPU 11a determines that the transmission timing of the request signal has arrived, whenever a predetermined time period elapses in a state where the drive source of the vehicle C has started, for example. The predetermined time is 1 second, for example.

If it is determined that the transmission timing has not arrived (S21: NO), the CPU 11a stands by until the transmission timing arrives. On the other hand, if it is determined that the transmission timing has arrived (S21: YES), the CPU 11a sequentially transmits the request signal to each transmission apparatus 2 (step S22).

Each transmission apparatus 2, having received the request signal, detect the air pressure of the tire 3 mounted on the tire wheel on which the transmission apparatus 2 is disposed as described above, and transmits the detected air pressure and the apparatus ID of the transmission apparatus 2 to the in-vehicle reporting apparatus 1.

The CPU 11a determines whether an air pressure and an apparatus ID transmitted from a transmission apparatus 2 in response to the transmitted request signal have been received (step S23). If it is determined that an air pressure and an apparatus ID have not been received (S23: NO), the CPU 11a stands by until an air pressure and an apparatus ID are received. The reception unit 14 that receives the air pressure and the apparatus ID in step S23 corresponds to an air pressure information acquisition unit.

If it is determined that an air pressure and an apparatus ID have been received (S23: YES), the CPU 11a determines whether any of the tires 3 of the vehicle C have been replaced (step S24). Specifically, the CPU 11a determines whether any of the tires 3 have been replaced, depending on whether contents are stored in the correspondence table 12.

If it is determined that one or more of the tires 3 have been replaced (S24: YES), the CPU 11a determines whether the received air pressure is less than or equal to a predetermined threshold (step S25). The predetermined threshold is a value at which replacement, inspection or the like of a tire 3 is required in order to prevent problems from occurring due to a decrease in the air pressure of the tire 3 when the vehicle C is running. The CPU 11a functions as an air pressure threshold determination unit by executing the control program in step S25. If it is determined that the received air pressure is not less than or equal to the predetermined threshold, that is, that the air pressure is higher than the predetermined threshold (S25: NO), the CPU 11a ends the processing.

If it is determined that the received air pressure is less than or equal to the predetermined threshold (S25: YES), the CPU 11a causes the reporting unit 15 to report a warning (step S26). The reporting unit 15 reports in the above-mentioned mode shown in FIG. 5B. Thereafter, the CPU 11a ends the processing.

On the other hand, if it is determined in step S24 that none of the tires 3 have been replaced (S24: NO), the CPU 11a specifies the mounting position of the tire 3 that is identified by the received apparatus ID (step S27). Specifically, the CPU 11a specifies the mounting position corresponding to the received apparatus ID, based on the correspondence table 12 stored in the storage unit 11b.

Next, the CPU 11a determines whether the received air pressure is less than or equal to a predetermined threshold (step S28). The predetermined threshold is the same as the threshold used in the determination at step S25. If it is determined that the received air pressure less than or equal to the predetermined threshold (S28: YES), the CPU 11a causes the reporting unit 15 to report a warning indicating the value of the received air pressure and that the air pressure of that tire 3 is low, so that the specified tire 3 is identifiable (step S29). Thereafter, the CPU 11a ends the processing.

On the other hand, if it determined that the received air pressure is higher than the predetermined threshold (S28: NO), the CPU 11a causes the reporting unit 15 to report the received air pressure, so that the specified tire 3 is identifiable (step S30). The reporting unit 15 performs reporting in the above-mentioned mode shown in FIG. 5A. Thereafter, the CPU 11a ends the processing.

Note that the processing procedure from steps S24 to S30 is a processing procedure that the in-vehicle reporting apparatus 1 performs based on the air pressure and the apparatus ID transmitted from one transmission apparatus 2. The in-vehicle reporting apparatus 1 performs this processing procedure every time an air pressure and an apparatus ID are received from a transmission apparatus 2.

As a result of the above configuration and processing, the in-vehicle reporting apparatus 1 is able to determine whether the tires 3 have been replaced based on the acquired vehicle height of the vehicle C, and is able to change the reporting mode depending on whether any of the plurality of tires 3 provided on the vehicle C have been replaced. The in-vehicle reporting apparatus 1 of the present embodiment reports information that depends on the mounting position of a tire 3 and the air pressure of that tire 3, in the case where none of the tires 3 have been replaced, and does not perform reporting for every mounting position, in the case where any of the tires 3 have been replaced. Thus, errors in reporting can be prevented, by not performing reporting of the correspondence relationship of the mounting positions of the tires 3 and the transmission apparatuses 2 that is based on the correspondence table 12, in the period until the correspondence table 12 is updated. Also, the in-vehicle reporting apparatus 1 is able to use a configuration capable of detecting vehicle height that can be installed in a typical vehicle such as the vehicle height sensor 16 that is used in control related to optical axis adjustment of headlights, pressure control of air suspension or the like, and to suppress an increase in costs concerning the configuration.

Also, the in-vehicle reporting apparatus 1 is able to prevent errors in reporting in the case where any of the plurality of tires 3 have been replaced, by not reporting, for every mounting position of a tire 3, information that depends on the air pressure of the tire 3, for example. Also, the user can at least be made aware that the air pressure of one or more of the tires 3 is low even in the case where a tire 3 of the vehicle C has been replaced. Thus, convenience for the user can be improved.

Also, the in-vehicle reporting apparatus 1 is able to very accurately determine whether replacement of a tire 3 has been performed, by determining that a tire 3 has been replaced, in the case where the height of the vehicle is continuously greater than or equal to a predetermined height.

Note that although the present embodiment describes the reporting unit 15 as reporting information that depends on the air pressures received from the transmission apparatuses 2 using the reporting modes shown in FIGS. 5A and 5B, other reporting modes may be adopted. That is, the reporting unit 15 may report using display, sound, vibration or the like, as long as information that depends on the mounting positions and the air pressures of the tires 3 is reported, in the case where a tire 3 has not been replaced. Similarly, the reporting unit 15 may report using display, sound, vibration or the like, as long as information that depends on the mounting positions of the tires 3 is not reported, in the case where a tire 3 has been replaced. For example, the reporting unit 15 may be configured to display only the minimum value among the air pressures transmitted from the transmission apparatuses 2 or to display the plurality of air pressures in enumerated form, in the case where a tire 3 has been replaced.

Also, although the present embodiment describes the transmission apparatuses 2 as transmitting the air pressures of the tires 3 in response to a request from the in-vehicle reporting apparatus 1, a configuration may be adopted in which the transmission apparatuses 2 transmit the air pressures of the tires 3 at a predetermined timing. The predetermined timing is whenever a predetermined time period such as 1 second elapses after a predetermined point in time such as when the tires rotate or the engine starts, for example, and can be set as appropriate. At this time, the configuration of the transmission unit 13 and the LF transmitting antenna 18 of the in-vehicle reporting apparatus 1 and the reception unit 24 and the LF receiving antenna 26 of the transmission apparatus 2 is not essential. Also, at this time, it is not essential for the in-vehicle reporting apparatus 1 to perform the processing of steps S21 and S22 in FIG. 7.

Also, although the present embodiment described an example in which the in-vehicle reporting apparatus 1 acquires the air pressure as a result of receiving the air pressure detected and transmitted by the transmission apparatus 2, a configuration may be adopted in which other information related to air pressure is acquired. For example, a configuration may be adopted in which the transmission apparatus 2 transmits the level of the air pressure such as "high", "normal" or "low" according to the air pressure detected by the transmission apparatus 2, and the in-vehicle reporting apparatus 1 receives and reports the level of the air pressure.

Also, although step S18 of FIG. 6 shows the CPU 11a resetting the correspondence table 12, the fact that one or more of the tires 3 have been replaced may be indicated by processing other than resetting the correspondence table 12. For example, a configuration may be adopted in which the CPU 11a performs processing for temporarily storing information indicating that one or more of the tires 3 has been replaced in the storage unit 11c at step S18, and determines whether this information is temporarily stored in the storage unit 11c at step S24 of FIG. 7. In other words, any processing may be performed in step S18, as long as the reporting mode of the reporting unit 15 can be switched, based on the vehicle height of the vehicle C being greater than or equal to a predetermined height.

Furthermore, although the in-vehicle reporting apparatus 1 determines that the air pressure of a corresponding tire 3 is low by determining whether the air pressure transmitted from the transmission apparatus 2 is less than or equal to a predetermined threshold in steps S25 and S28 of FIG. 7, other anomalies in air pressure may be determined. The in-vehicle reporting apparatus 1 may, after determining that the air pressure is not less than or equal to the predetermined threshold in step S25 and step S28, determine whether the air pressure is greater than or equal to a second threshold that is larger than the first threshold, for example. In this case, the in-vehicle reporting apparatus 1 is determining whether the air pressure is a high air pressure requiring inspection, replacement or the like of the tire 3. Also, if it is determined that the air pressure is greater than or equal to the second threshold, the in-vehicle reporting apparatus 1 may be configured to display a warning message such as "Tire Pressure High" on the reporting unit 15.

The invention claimed is:

1. An in-vehicle reporting apparatus that includes an air pressure information acquisition unit configured to acquire identification information identifying each of a plurality of tires provided on a vehicle and air pressure information related to an air pressure of each of the plurality of tires, and that performs reporting that depends on the identification information and the air pressure information acquired by the air pressure information acquisition unit, comprising:

a storage unit configured to store a mounting position of each of the plurality of tires in association with the identification information identifying the tire;

a vehicle height acquisition unit configured to acquire a vehicle height of the vehicle;

a vehicle height determination unit configured to determine whether the vehicle height acquired by the vehicle height acquisition unit is greater than or equal to a predetermined height;

an air pressure threshold determination unit configured to determine whether an air pressure indicated by the acquired air pressure information is less than or equal to a predetermined threshold; and a detection unit configured to report information that depends on the mounting position of a tire stored in the storage unit in association with the identification information acquired by the air pressure information acquisition unit and on the air pressure information of the tire acquired by the air pressure information acquisition unit, in a case where the vehicle height determination unit determines that the acquired vehicle height is not greater than or equal to the predetermined height, and to report a result of the determination by the air pressure threshold determination unit that depends on the air pressure information of the tire acquired by the air pressure information acquisition unit, without reporting at least information that depends on the mounting position of the tire, in a case where the vehicle height determination unit determines that the acquired vehicle height is greater than or equal to the predetermined height.

2. The in-vehicle reporting apparatus according to claim 1, wherein the vehicle height acquisition unit is configured to acquire the vehicle height of the vehicle repetitively, and the vehicle height determination unit is configured to determine whether the vehicle height repetitively acquired by the vehicle height acquisition unit is continuously greater than or equal to the predetermined height for greater than or equal to a predetermined time period or a predetermined number of times.

3. A reporting system comprising:

the in-vehicle reporting apparatus according to claim 2; and a plurality of transmission apparatuses respectively disposed on a plurality of tire wheels provided on a vehicle, and configured to detect an air pressure of a corresponding tire, and transmit air pressure information including the detected air pressure and identification information identifying the corresponding tire, wherein the air pressure information acquisition unit is configured to acquire the air pressure information and the identification information transmitted from each of the plurality of transmission apparatuses.

4. A reporting system comprising:

the in-vehicle reporting apparatus according to claim 1; and a plurality of transmission apparatuses respectively disposed on a plurality of tire wheels provided on a vehicle, and configured to detect an air pressure of a corresponding tire, and transmit air pressure information including the detected air pressure and identification information identifying the corresponding tire, wherein the air pressure information acquisition unit is configured to acquire the air pressure information and the identification information transmitted from each of the plurality of transmission apparatuses.

* * * * *